United States Patent
Revis

(10) Patent No.: US 6,706,398 B1
(45) Date of Patent: Mar. 16, 2004

(54) ORGANOSILICON COMPOUNDS AND BLENDS FOR TREATING SILICA

(75) Inventor: Anthony Revis, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/243,339

(22) Filed: Sep. 13, 2002

(51) Int. Cl.[7] .................................................. B32B 9/04
(52) U.S. Cl. ........................ 428/405; 427/387; 523/212
(58) Field of Search ........................ 428/405; 427/387; 523/212

(56) References Cited

U.S. PATENT DOCUMENTS

| | | | |
|---|---|---|---|
| 4,481,328 A | * 11/1984 | Harreus et al. | 524/493 |
| 4,560,711 A | * 12/1985 | Suzuki | 523/212 |
| 5,908,660 A | 6/1999 | Griffith et al. | 427/220 |
| 6,051,672 A | 4/2000 | Burns et al. | 528/31 |

FOREIGN PATENT DOCUMENTS

| EP | 0236674 B1 | 9/1987 | C08L/23/04 |
|---|---|---|---|
| WO | WO 01/21715 A1 | 8/2000 | C09C/1/30 |

* cited by examiner

*Primary Examiner*—Margaret G. Moore
(74) *Attorney, Agent, or Firm*—Jim L. DeCesare

(57) ABSTRACT

Modified silica fillers are prepared by a method in which silica surfaces are contacted with compositions containing organosilicon compounds. The organosilicon compounds in the compositions are only of types of structural groups of monomeric dichlorosilanes and trialkoxysilanes. The compositions may be (i) mixtures or blends of alkyl and aryl group containing dichlorosilanes and trialkoxysilanes free of hydrocarbon or organofunctional groups reactive with silica surfaces, (ii) mixtures or blends of substituted alkyl and substituted aryl group containing dichlorosilanes in which the dichlorosilanes are free of hydrocarbon or organofunctional groups reactive with silica surfaces and trialkoxysilanes free of hydrocarbon or organofunctional groups reactive with silica surfaces, or (iii) substituted and unsubstituted alkyl and aryl group containing dichlorosilanes in which the dichlorosilanes are free of hydrocarbon or organofunctional groups reactive with silica surfaces. The mixtures and blends contain the dichlorosilanes and trialkoxysilanes in a weight ratio of 1:0.1 to 1:2, respectively.

5 Claims, No Drawings

ORGANOSILICON COMPOUNDS AND BLENDS FOR TREATING SILICA

FIELD OF THE INVENTION

This invention is related to a method of making a modified silica filler in which silica is contacted with a blend or mixture of (i) an alkyl and aryl group containing dichlorosilane and (ii) a trialkoxysilane free of hydrocarbon or organofunctional groups reactive with a silica surface, in a weight ratio of 1:0.1 to 1:2, respectively. In an alternate embodiment, modified silica fillers can be made by contacting silica with only the alkyl and aryl group containing dichlorosilane.

BACKGROUND OF THE INVENTION

This is an improvement in methods of modifying silica fillers, as described in for example, U.S. Pat. No. 6,384,125 (May 7, 2002), which is assigned to the same assignee as the present invention. While the '125 patent refers generally to the use of some similar organometallic compounds and mixtures thereof as the present invention, and their use as hydrophobing agents for silica, it does not describe any particular mixture or blend of organosilicon compounds as being any more effective than any other blend, nor does the '125 patent identify the existence of any particular ratio of organosilicon compounds as being necessary to achieve a new and unexpected results, i.e., an ability to deposit more siloxane on silica, vis a viz, improved hydrophobicity. In addition, the '125 patent fails to teach using only single organosilicon compounds of the type of alkyl and aryl group containing dichlorosilanes, as the '125 patent requires as a second component, what it refers to as a functionalizing coupling agent.

SUMMARY OF THE INVENTION

The invention is directed to a method of making modified silica fillers in which silica is contacted with a blend or mixture of organosilicon compounds. In particular, it is directed to an improvement in treating silica with blends or mixtures of (i) an alkyl and aryl group containing dichlorosilane and (ii) a trialkoxysilane free of hydrocarbon or organofunctional groups reactive with a silica surface, in weight ratios of 1:0.1 to 1:2, respectively. Preferably, the weight ratio is 1:0.3 to 1:1, and most preferably the weight ratio is 1:0.5. In another embodiment, the treating agent for silica may consist of only (i) the alkyl and aryl group containing dichlorosilane.

In particular, the invention is directed to a method of making modified silica fillers in which silica surfaces are contacted with compositions containing organosilicon compounds. The improvement consists of treating silica surfaces with compositions in which the organosilicon compounds in the compositions are only of types of structural groups of monomeric dichlorosilanes and trialkoxysilanes. The compositions may be (i) mixtures or blends of alkyl and aryl group containing dichlorosilanes and trialkoxysilanes free of hydrocarbon or organofunctional groups reactive with silica surfaces, (ii) mixtures or blends of substituted alkyl and substituted aryl group containing dichlorosilanes in which the dichlorosilanes are free of hydrocarbon or organofunctional groups reactive with silica surfaces and trialkoxysilanes free of hydrocarbon or organofunctional groups reactive with silica surfaces, or (iii) substituted and unsubstituted alkyl and aryl group containing dichlorosilanes in which the dichlorosilanes are free of hydrocarbon or organofunctional groups reactive with silica surfaces. The mixtures and blends contain dichlorosilanes and trialkoxysilanes in a weight ratio of 1:0.1 to 1:2, respectively.

These and other features of the invention will become apparent from a consideration of the detailed description.

DETAILED DESCRIPTION OF THE INVENTION

The silica used to make the modified silica fillers according to this invention are the colloidal or precipitated silicas of the type used to formulate polymeric compositions such as rubber, particularly those rubber compositions used in the manufacture of vehicle tires for improving the mechanical properties of tire rubber. Such silicas are described in much detail in the '125 patent to which reference may be had, and which is considered as being incorporated herein by reference thereto.

Mineral fillers such as silica, having a small particle size and a large surface area, are capable of increasing the tensile strength of rubber compounds and therefore are useful as reinforcing materials for rubber; particularly when the mineral surfaces of the filler are converted to hydrophobic low energy surfaces.

Silica treating agents according to the invention are mixtures and blends of alkyl and aryl group containing dichlorosilanes, and trialkoxysilanes, both of which are preferably free of hydrocarbon or organofunctional groups reactive with silica surfaces. Thus, the organosilicon compounds useful according to the invention may contain alkyl groups, cycloalkyl groups, araalkyl (arylalkyl) groups, allaryl (alkylaryl) groups, aryl groups, and certain substituted groups which are not reactive with respect to silica surfaces.

Some examples of alkyl groups are methyl, ethyl, propyl, butyl, hexyl, octyl, decyl, dodecyl, octadecyl, and nonadecyl. Some examples of cycloalkyl groups are cyclobutyl and cyclohexyl. Some examples of araalkyl (arylalkyl) groups are benzyl, phenylethyl, and 2-phenylpropyl. Some examples of alkaryl (alkylaryl) groups are tolyl and mesityl. Some examples of aryl groups are phenyl, xenyl, naphthyl, and anthracyl. Some examples of substituted groups which are not reactive with respect to silica surfaces are halogenated alkyl groups and aryl groups such as chloromethyl, dichloromethyl, trichloromethyl, 3-chloropropyl, chlorocyclohexyl, chlorophenyl, and dichloroxenyl; alkyl groups containing alkoxy radicals such as methoxy, ethoxy, butoxy, and pentoxy; alkyl groups containing sulfido (—S—), disulfido, or polysulfido radicals; and alkyl groups containing cyano (—C≡N) radicals.

Representative of some suitable alkyl and aryl group containing dichlorosilanes are t-butylphenyldichlorosilane, chlorophenylmethyldichlorosilane, phenylethyldichlorosilane, phenylmethyldichlorosilane (methylphenyldichlorosilane) (MPDCS), and p-tolylmethyldichlorosilane.

Representative of some suitable trialkoxysilanes are benzyltriethoxysilane, 2-chloroethyltriethoxysilane, (p-chloromethyl)phenyltrimethoxysilane, (p-chloromethyl) phenyltri-n-propoxysilane, chloromethyltriethoxysilane, chloromethyltrimethoxysilane, chlorophenyltrietioxysilane, 3-chloropropyltriethoxysilane, 3-chloropropyltrimethoxysilane, 2-cyanoethyltriethoxysilane, 2-cyanoethyltrimethoxysilane, 3-cyanopropyltriethoxysilane, 3-cyanopropyltrimethoxysilane, 11-cyanoundecyltrimethoxysilane, cyclohexyltrimethoxysilane, ethyltriethoxysilane, ethyltrimethoxysilane, 3-mercaptopropyltriethoxysilane (MPTES), 3-mercaptopropyltrimethoxysilane, methyltriethoxysilane, methyltrimethoxysilane, pentyltriethoxysilane, phenethyltrimethoxysilane, phenyltriethoxysilane, phenyltrimethoxysilane, n-propyltriethoxysilane, n-propyltrimethoxysilane, and p-tolyltrimethoxysilane.

A general method of making modified silica fillers according to the invention is described below in Example A, although the modified silica fillers can be made by any known and accepted technique, for example, as described in detail in the '125 patent, in U.S. Pat. No. 5,908,660 (Jun. 1, 1999), and in U.S. Pat. No. 6,051,672 (Apr. 18, 2000). While these patents describe general methods, they fail to describe the features of this invention, i.e., the use of a particular mixture or blend of organosilicon compound(s) in a particular ratio.

When used in rubber compositions for manufacturing vehicle tires, other conventional additives may be used along with the modified silica filler, including other fillers such as carbon black, various oils, plasticizers, accelerators, antioxidants, heat stabilizers, light stabilizers, zone stabilizers, extenders, and coloring pigments.

EXAMPLES

The following examples are set forth in order to illustrate the invention in more detail. The silica slurry used in the examples contained 6.5 percent by weight of silica, and is a commercial product of PPG Industries, Inc., Pittsburgh, Pa. Neutralization was carried out by using a standard solution containing 25 percent by weight of sodium hydroxide, and it was prepared by dissolving 1000 grams of sodium hydroxide pellets in 3000 millilitre of deionized water.

The apparatus used in treating the silica consisted of a 5-liter round-bottom reaction flask, with ball joints, a Teflon® shaft stirring paddle assembly, an overhead electrical stirring motor, and a Type-K thermocouple temperature controller with a flexible heating mantle. The reaction flask was surmounted with a Dean-Stark trap and water cooler condenser with a port for a sealed glass thermocouple well directly submersed into the reaction flask. The third neck of the reaction flask was sealed with a ball-joint cap or an addition funnel. Filtration and washing of treated silica fillers and silica filler cakes was conducted with a 253 mm Coors Porcelain Buchner funnel containing Whatman filter paper. The funnel was mounted on a 4-liter filter flask. A Fisher brand Digital Conductivity Meter was used to measure the conductivity of the filtrate from the washing process. A Mettler Toledo Portable pH\Ion Meter, Model No. MP125 was used to measure pH.

The following procedure, used in Example 2, represents the general procedure which was repeated in the other Examples 1 and 3–10. Data for each of the Examples 1–10 is shown in Table 1.

Example A

A General Procedurefor Examples 1–10

The reaction flask was charged with 2000 g of silica slurry and 165 g of concentrated sulphuric acid. The slurry was heated to a temperature of 70° C. and the heat was then turned off. At this point, a mixture containing 9.10 g of 3-mercaptopropyltriethoxysilane and 25.5 g of methylphenydichlorosilane was added directly to the reaction flask via a long-stem funnel in rapid fashion over a period of about 2–7 minutes. The treated slurry was then allowed to stir as it cooled to room temperature over a 60-minute period.

To the stirred slurry was added 600 mL of a solution containing 25 percent by weight of sodium hydroxide, in order to adjust the pH in the range of 3.4 to 3.7. The neutralized slurry was transferred to the Buchner funnel and vacuum filtered to removed the aqueous phase. The filter cake was then washed repeatedly with copious amounts of water until the filtrate read less than 100 micro ohms. After allowing it to air-dry overnight, the filter cake was transferred to plastic pails with lids and spray dried as follows.

The air-dried treated silica was re-slurried in deionized water to provide a slurry containing 20–40 percent by weight of the treated silica The slurry was mixed until all of the solids were broken up. The slurry was then pumped to a Niro Atomizer spray drier at a rate of about 20 ml/minute with an inlet temperature of 260° C. and an outlet temperature of between 120–140° C. The dried and treated silica product was collected and stored in glass jars.

An elemental analysis of the treated silica was conducted by an independent testing laboratory. The results of elemental analyses obtained for treated silica fillers prepared in Examples 1–10 are shown in Table 1.

In Table 1, the following abbreviations and acronyms are used. MPTES represents 3-mercaptopropyltriethoxysilane HS—$CH_2CH_2CH_2$—$Si(OCH_3)_3$, DMDCS represents dimethyldichlorosilane $(CH_3)_2SiCl_2$, MPDCS represents methylphenyldichlorosilane $(CH_3)(C_6H_5)SiCl_2$, MEDCS represents methyletfiyldichlorosilane $(CH_3)(C_2H_5)SiCl_2$, and DPDCS represents diphenyldichlorosilane $(C_6H_5)_2SiCl_2$.

TABLE 1

| Examples | Grams MPTES | Grams DMDCS | Grams MPDCS | Grams MEDCS | Grams DPDCS | Percent Carbon Theory | Actual | % Loss |
|---|---|---|---|---|---|---|---|---|
| 1 Comparison | 9.1 | 25.5 | | | | 4.00 | 2.93 | 27 |
| 2 Invention | 9.1 | | 25.5 | | | 8.11 | 7.94 | 2 |
| 3 Comparison | 9.1 | | | 25.5 | | 5.98 | 3.96 | 22 |
| 4 Comparison | 9.1 | 19.5 | | | | 3.29 | 2.51 | 20 |
| 5 Invention | 9.1 | | 19.5 | | | 6.58 | 6.37 | 3 |
| 6 Comparison | 9.1 | | | 19.5 | | 4.19 | 3.33 | 21 |
| 7 Invention | 9.1 | | 15.0 | | | 5.36 | 4.74 | 12 |
| 8 Comparison | 9.1 | | | 15.0 | | 3.48 | 2.31 | 34 |
| 9 Comparison | 9.1 | | | | 25.5 | 10.25 | 4.28 | 58 |
| 10 Invention | 9.1 | | 25.5 | | | 7.56 | 6.64 | 12 |

In Table 1, Examples 1, 3, 4, 6, 8, and 9 are Comparison Examples. Examples 2, 5, 7, and 10, on the other hand represent Examples according to the present invention. Thus, Comparison Example 1 shows a yield which can be obtained in terms of a percent loss of 27 percent when using dialkyldichlorosilanes having two of the same types of alkyl groups such as dimethyldichlorosilane, instead of using an alkyl and aryl group containing dichlorosilane. A comparison between Comparison Example 1 and Example 2 which is according to the invention and includes using an alkyl and aryl group containing dichlorosilane such as methylphenyldichlorosilane, shows that significantly improved deposition yields in terms of a percent loss of only 2 percent, can be obtained by replacing an alkyl group with an aryl group.

Comparison Example 3 is similar to Comparison Example 1 in that both examples use dialkyldichlorosilanes, but in Comparison Example 3 the alkyl groups were not the same, i.e., methylethyldichorosilane was used instead of dimethyldichlorosilane. In either case, however, the percent loss was significantly higher than obtained in Example 2 which represents the invention. By comparing Examples 5 and 7 with Example 2, it can be seen that the concentration of the alkyl and aryl group containing dichlorosilane in the mixture will significantly effects the percent loss if it is lowered beyond a certain point.

Comparison Example 9 shows that when a diaryldichorosilane such as diphenyldichlorosilane is used, the deposition yield in terms of percent loss is extremely low, confirming the uniqueness of using an alkyl and aryl group containing dichlorosilane according to the invention. Example 10 relates to the alternate embodiment of the invention in which only the alkyl and aryl group containing dichlorosilane, i.e., MPDCS, is used to treat silica, and it provided equivalent significantly improved deposition yield in terms of a percent loss of only 12 percent.

Reference may be had to copending U.S. patent application Ser. No. 10/199,400 filed Jul. 18, 2002, entitled "Tetrahalosilane Blends for Treating Silica", and to copending U.S. patent application Ser. No. 10/199,403, filed Jul. 18, 2002, entitled "Chlorosilane Blends for Treating Silica", both assigned to the same assignee as the present invention. However, neither of the assignee's copending applications are directed to silica treatments of the nature claimed in the present application.

Other variations may be made in compounds, compositions, and methods described herein without departing from the essential features of the invention The embodiments of the invention specifically illustrated herein are exemplary only and not intended as limitations on their scope except as defined in the appended claims.

What is claimed is:

1. In a method of making modified silica fillers in which silica sufaces are contacted with compositions containing organosilicon compounds, the improvement comprising treating silica surfaces with compositions in which the organosilicon compounds in the compositions are only of types of structural groups of monomeric dichlorosilanes and trialkoxysilanes comprising (i) mixture or blends alkyl and aryl group containing dichlorosilanes and trialkoxysilanes, and (ii) mixtures or blends of substituted alkyl and substituted aryl group containing dichlorsilanes in which the dichlorosilanes are free of hydrocarbon or organofunctional groups reactive with silica surfaces and trialkoxysilanes, wherein the mixtures and blends containing the dichlorosilanes and the trialkoxysilanes are in a weight ratio of 1:0.1 to 1:2, repectively.

2. A method according to claim 1 in which the weight ratio is 1:0.3 to 1:1.

3. A method according to claim 2 in which the weight ratio is 1:0.5.

4. A method according to claim 1 in which the mixtures and blends contain alkyl and aryl group containing dichlorosilanes selected from the group consisting of t-butylphenyidichlorosilane, chlorophenylmethyldichlorosilane phenylethyldichlorosilane, phenylmethyldichlorosilane (methylphenyldichlorosilane), and p-tolylmethyldichlorosilane.

5. A method according to claim 1 in which the mixtures and blends contain trialkoxysilanes selected from the group consisting of benzyltriethoxysilane, 2-chloroethyltriethoxysilane, (p-chloromethyl) phenyltrimethoxysilane, (p-chloromethyl)phenyltri-n-propoxysilane, chloromethyltriethoxysilane, chloromethyltrimethoxysilane, chlorophenyltriethoxysilane, 3-chloropropyltriethoxysilane, 3-chloropropyltrimethoxysile, 2-cyanoethyltriethoxysilane, 2-cyanoethyltrimethoxysilane, 3-cyanopropyltriethoxysilane, 3-cyanopropyltrimethoxysilane, 11-cyanoundecyltrimethoxysilane, cyclohexyltrimethoxysilane, ethyltriethoxysilane, ethyltrimethoxysilane, 3-mercaptopropyltriethoxysilane, 3-mercaptopropyltrimethoxysilane, methyltriethoxysilane, methyltrimethoxysilane, pentyltriethoxysilane, phenethyltrimethoxysilane, phenyltriethoxysilane, phenyltrimethoxysilane, n-propyltriethoxysilane, n-propyltrimethoxysilane, and p-tolyltrimethoxysilane.

* * * * *